US006856148B2

United States Patent
Bodenstab

(10) Patent No.: US 6,856,148 B2
(45) Date of Patent: Feb. 15, 2005

(54) METHOD AND PROGRAM PRODUCT FOR EVALUATING A CIRCUIT

(75) Inventor: Paul Robert Bodenstab, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 306 days.

(21) Appl. No.: 10/094,439

(22) Filed: Mar. 8, 2002

(65) Prior Publication Data

US 2003/0169059 A1 Sep. 11, 2003

(51) Int. Cl.[7] .............................. G01R 1/00; G01R 27/08
(52) U.S. Cl. ..................... 324/713; 324/73.1; 703/14; 703/18
(58) Field of Search .............................. 703/14, 18, 4; 324/713, 555, 765, 158.1, 522; 716/4, 12

(56) References Cited

U.S. PATENT DOCUMENTS

| 5,553,008 | A | * | 9/1996 | Huang et al. ................. 703/14 |
| 5,828,580 | A | * | 10/1998 | Ho ............................... 716/12 |
| 5,933,358 | A | | 8/1999 | Koh ............................. 703/14 |
| 6,311,147 | B1 | | 10/2001 | Tuan ............................ 703/18 |
| 6,631,502 | B2 | * | 10/2003 | Buffet et al. ................... 716/4 |

* cited by examiner

Primary Examiner—Vincent Q. Nguyen

(57) ABSTRACT

A method for evaluating a power distribution network for a circuit has steps of creating a circuit model of the circuit in which all wires and transistors are represented as circuit elements, with the model comprising a plurality of nodes. A DC power analysis is performed on the circuit model to determine voltage drops at a plurality of the nodes.

24 Claims, 3 Drawing Sheets

METHOD AND PROGRAM PRODUCT FOR EVALUATING A CIRCUIT

FIELD OF THE INVENTION

The present invention is related to modeling and analyzing circuits. More particularly, the present invention is related to methods and program products for modeling and analyzing a power distribution network of an electrical circuit.

BACKGROUND OF THE INVENTION

As integrated circuits ("IC") have grown in complexity, the development and testing of circuits has become increasingly difficult and burdensome. Modern IC's may comprise transistors and the like that number into the millions, with a multiple of that number of connection wires. Different logical gate conditions will lead to different signal propagation through the IC, with the result that different IC operation permutations may exist for all possible gate condition combinations. When the number of gates numbers into the millions for circuits such as very large system integrations ("VLSI"), the number of permutations can be enormous. Also, the rapidly increasing operating speeds of circuits, some of which have currently crossed the gigahertz threshold, further complicate the modeling of circuits. Accordingly, accurate modeling of and analyzing the operation of modern circuits such as VLSI's can require computational resources that are so large as to be impractical.

Effective modeling of these circuits, however, can be a valuable tool in their design and manufacture. For example, in the design and manufacture of VLSI's, it is important to insure that the VLSI power distribution networks are of sufficiently low impedance in the VLSI. Excessive impedance can disadvantageously cause larger than expected local voltage drops along the power distribution network due to such factors as the resistance of metal layers used to carry the power signal and the amount of current flowing through them. Excessive impedance can cause large voltage variations in the driving signal as well as the surrounding distribution network that can ultimately lead to logic failures. Possible circuit failures can occur if the electrical impedance of even a local power distribution network is too high.

Modeling of circuit performance can be used to avoid these excessive impedance related problems. Under current methods, however, useful models of high speed VLSI's have proven exceedingly difficult and burdensome to accomplish. These models may require details of the specific logic being implemented and its connections to the power distribution network, the worst case switching behavior of all the signals and logic, and other detailed circuit data. An impedance evaluation of a VLSI incorporating all of this information could require development of a three-dimensional model and subsequent application of Maxwell's equations to the model. Such an approach would require extraordinary effort and computer resources.

Indeed, prior art computational tools providing such models have proven to be costly, cumbersome, and burdensome to use. Also, as these tools require knowledge of the worst case switching behavior, their use is generally limited to a relatively late stage in circuit design when detailed circuit logic is available. Any problems discovered at this late stage may be difficult to address as circuit changes may have wide ranging downstream effects. For these reasons, some prior art circuit design and analysis efforts did not use formal modeling tools to address power distribution impedance concerns, but instead relied on the "intuitive feel" of designers for network design. For modern circuits of appreciable complexity and size, with VLSI's being an example, this practice has proven unsatisfactory.

Unresolved needs in the art therefore exist.

SUMMARY OF THE INVENTION

An embodiment of the present invention is directed to a method for evaluating a power distribution network for an integrated circuit. Generally, a method embodiment comprises the steps of creating a model of the circuit where all transistors and wires are represented as circuit elements. A DC circuit analysis is then run on this model, with the voltage drop at at least some model nodes determined.

The present invention thereby provides a method for modeling integrated circuits in a relatively easy to use format that requires minimal resources to judge the overall quality of the power distribution network. Also, as some embodiments of the invention model all circuit transistors with circuit elements and then simulate current flowing through these elements, these embodiments assume that all switches are closed. Detailed and cumbersome modeling of different switch permutations is thereby avoided. This also allows for the model of the invention to be conducted relatively early in the circuit design project. It will be relatively easy to make changes to the circuit at these early design stages.

Those skilled in the art will appreciate that the present invention lends itself well to practice in the form of a computer program product. Accordingly, embodiments of the present invention comprise computer program products comprising computer readable instructions embedded in a computer readable medium that when executed cause a computer to carry out steps of method embodiments of the invention.

The above brief description sets forth broadly some of the features and advantages of the present disclosure so that the detailed description that follows may be better understood, and so that the present contributions to the art may be better appreciated. Before explaining the embodiment of the disclosure in detail, it is to be understood that the disclosure is not limited in its application to the details of the construction set forth in the following description or illustrated in the drawings. The present invention may provide additional embodiments, as will be appreciated by those knowledgeable in the art. Also, it is to be understood that the phraseology and terminology employed herein are for description and not limitation.

DETAILED DESCRIPTION

Figure 1:
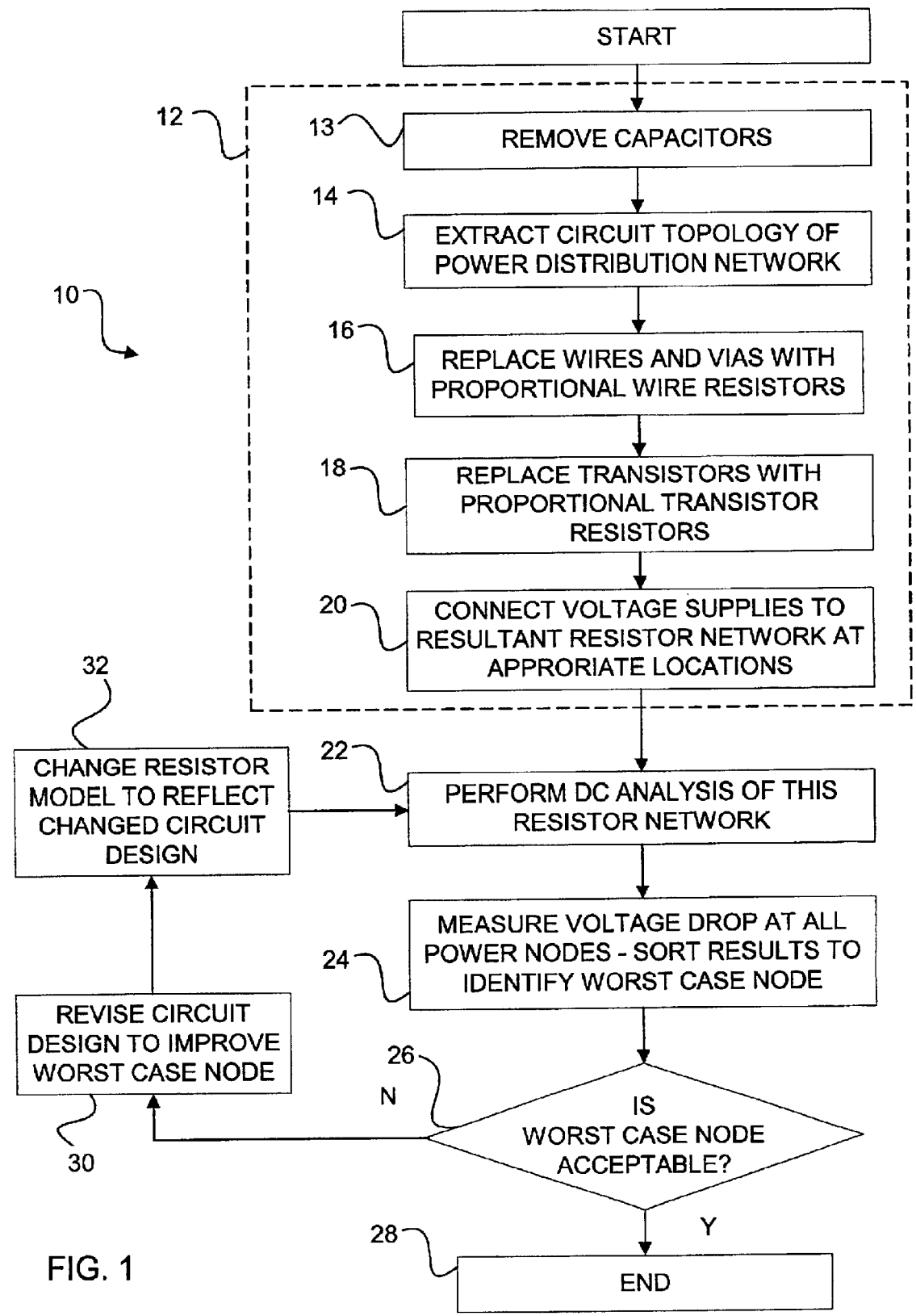
FIG. 1 is a flowchart illustrating steps of an invention embodiment.

Turning now to the drawings, FIG. 1 is a flow chart illustrating an embodiment of a method and a program product of the invention. It will be appreciated that the present invention is well suited for practice in the form of a computer program product, and accordingly that the present invention may comprise computer program product embodiments. These embodiments may comprise computer executable instructions embedded in a computer readable medium that when executed by a computer cause the computer to carry out various steps.

The executable instructions may comprise computer program language instructions that have been compiled into a machine-readable format. The computer readable medium may comprise a magnetic, optical, or circuitry medium useful for storing data. Also, it will be appreciated that the term "computer" as used herein is intended to broadly refer to any machine capable of reading and executing recorded instructions.

The steps performed by the computer upon execution of the instructions may generally be considered to be steps of method embodiments of the invention. That is, as discussed herein it will be understood that method embodiment steps may likewise comprise program product steps. With reference to FIG. 1 by way of example, it will be appreciated that the invention embodiment 10 illustrated may comprise a method embodiment or a computer program embodiment.

The embodiment 10 is directed to evaluating the quality of a power distribution network of an integrated circuit, and also to identifying worst-case power drop nodes that are likely to cause high impedance in an integrated circuit. The embodiment 10 will be of particular utility when practiced on VLSI's, and may be practiced using a circuit design that comprises at least a plurality of wires, a plurality of capacitors, and a plurality of switches. Those skilled in the art of integrated circuit design and evaluation will appreciate that the term "wire" as used herein is not intended to be limited to flexible thin cylindrical rods or the like, but is instead intended to broadly refer to conducting paths useful for communicating electrical signals.

For example, those skilled in the art will appreciate that in an integrated circuit ("IC") such as a VLSI, a wire may comprise thin metal layers deposited on a chip for communicating electrical signals between switches, power sources and ground, and like components. These wires are typically elongated strips having a substantially rectangular cross-section. Also, an IC may comprise multiple independent wires (e.g., metal layers) deposited one over the other, with vias linking vertical layers to one another as desired. IC switches may comprise transistors, with common examples comprising p-channel and n-channel field effect transistors (FET's).

The embodiment 10 begins by creating a resistor network model for the circuit design (dashed line block 14). To create the resistor network, the embodiment 10 comprises a step of removing capacitors from the design (block 13). It is noted that capacitors may remain in the resistor network without substantially affecting the outcome of the ultimate analysis. It is preferred, however, that the invention comprise a step of removing capacitors as this allows for a simpler and smaller model that will require less resources to study than if capacitors remained. Also, it will be appreciated that the invention may be practiced on circuits that do not comprise capacitors.

The embodiment 10 further comprises extracting the circuit topology of a power distribution network of the circuit design (block 12). Preferably, this step is accomplished by referencing at least wire geometry data for the artwork of the subject IC. Those knowledgeable in the art will appreciate that in creating an IC, artwork is generally created that details the geometry of the metal layer wires and vias. The geometry data may comprise information such as material identification, length, width, thickness, location placement (two or three dimensional), material sheet resistivity, and the like. This information may be present in digital form in a database or other storage repository. Program product embodiments of the invention may comprise a step of querying such a database to obtain this data. Using this information, the resistance of the wires and vias can be determined. The IC wires and vias are then replaced in the resistor model with representatively sized resistors, referred to as "wire resistors" (block 16).

Figure 2:
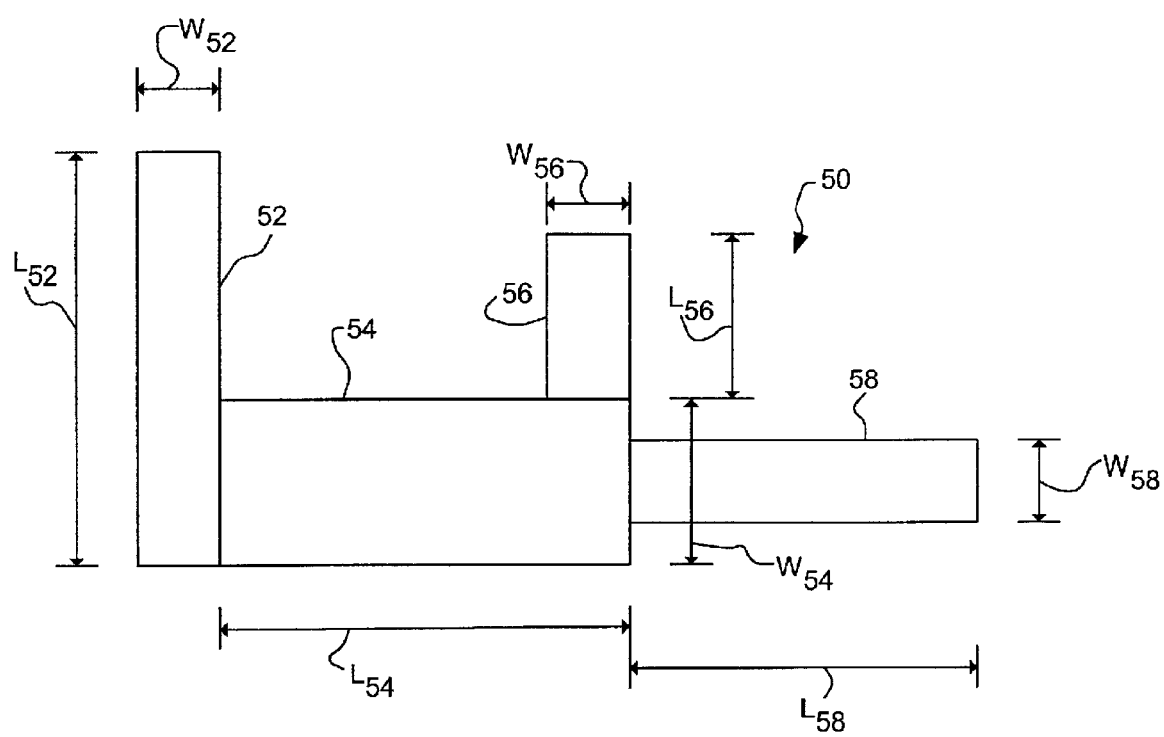
FIG. 2 is an illustration of wire segments useful for illustrating an invention embodiment.

Preferably, the wires are subdivided into segments, with each segment being replaced by a single wire resistor. Wire geometry data and segments may be further illustrated by reference to FIG. 2, which illustrates a wire 50 comprised of the connected wire segments 52, 54, 56, and 58, with the wire 50 intended to represent a portion of an integrated circuit (other circuit connections not illustrated). Each segment 52–58 is characterized in that each has a length L and a width W. It will be appreciated that each segment 52–58 also has a thickness (not shown). The individual wire segments are preferably defined by constant width portions. That is, a given length of a wire may be represented by a single wire resistor so long as the length has a constant width. Should the width of the wire change, a new segment is defined, as generally illustrated by FIG. 2. Also, segments may be defined by substantially straight runs of the metal layers, with a change in direction such as a non-linear turn (e.g., the 90° turns of wire 50) defining the beginning of a new segment. As used herein, then, segments may thereby be defined as substantially straight runs of constant width.

Each wire segment can further be characterized in that each has a sheet resistivity σ. Those knowledgeable in the art will appreciate that a sheet resistivity generally comprises a resistance value for a material that incorporates a material thickness, and thereby allows for the resistance of a given element of the material to be determined using only the length and width of the material. The resistance of a given segment may then be determined by relating its sheet resistivity, length, and width, for example by: $\Omega_{SEG}{}^{\bullet}=\sigma\times(L_{SEG}/W_{SEG})$.

The embodiment 10 further comprises a step of replacing the IC transistors with proportional resistors, referred to herein as "switch resistors." The resistance of each of the transistors may be determined through consideration of the transistor device characteristics, which may include, but are not limited to, a sheet resistivity, length and width of the transistor, and more specifically the length/width ratio. This transistor data may be obtained from a drawing, a digital database or similar repository, or the like. This transistor data may be stored in the same database or repository as the wire and via data. Indeed, those skilled in the art will appreciate that software tools are available for extracting, collecting, storing, and organizing circuit topology data comprising wire, transistor, and via geometry data. When practicing a computer program embodiment of the invention, the computer may be caused to query such a digital data repository to obtain this data or to otherwise extract this data from the digital repository.

The thus created resistor model thereby represents wire segments and transistors as resistors. IC capacitors have been removed, and are therefore not included in the resistor model. The embodiment 10 further comprises a step of providing DC power supplies and ground sources connected at nodes that correspond to the actual physical location of the power supply connections in the IC design (block 20).

The resistor model as created also comprises a plurality of nodes defined between terminals of consecutive resistors. As used herein, the term "node" is intended to broadly correspond to a location on the resistor model having substantially equal potential between one or more sequential wire/switch resistors. In the embodiment 10, the nodes may comprise power nodes, ground nodes, or internal nodes. Power nodes are defined as nodes that are directly connected to a power source in an ideal case (e.g., assuming wire has zero resistance). That is, power nodes are nodes that are directly connected to a power source by wire segments. Likewise, ground nodes are defined as directly connected to ground (or low voltage) in an ideal model (i.e. connected to ground by wire segments). Internal nodes may be defined as all other nodes. For example, internal nodes are nodes that are separated from a power source and ground by a transistor.

Figure 3:
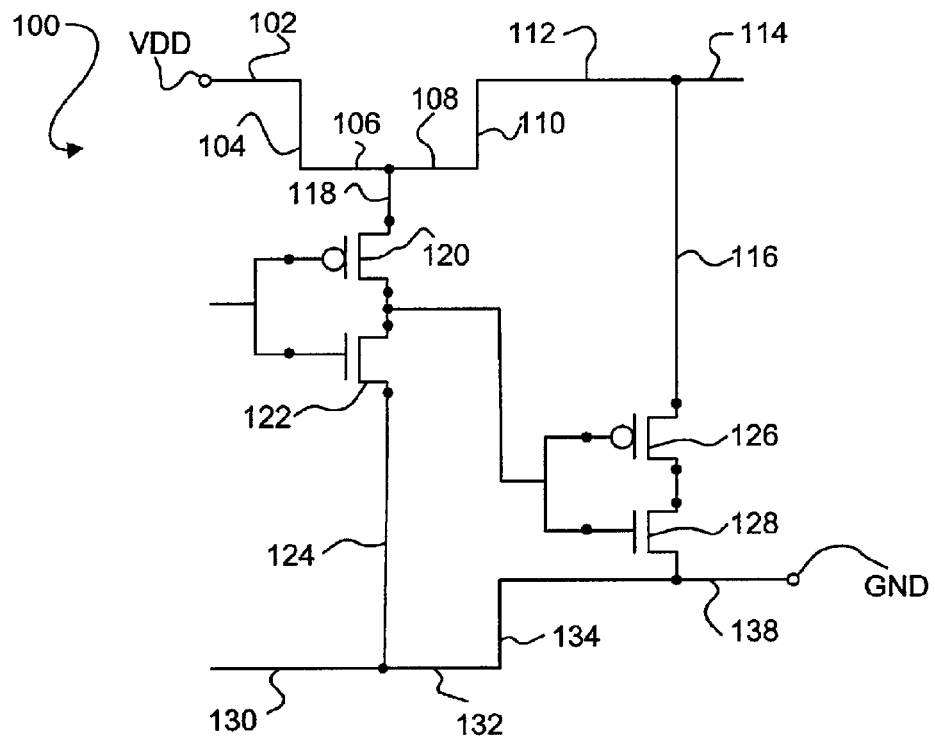
FIG. 3 is a schematic of a portion of an integrated circuit.

These steps of creating a resistor model (collectively block 12) may be further illustrated by reference to the schematic circuit 100 shown in FIG. 3 in addition to the corresponding resistor model schematic 200 shown in FIG. 4 that results from practice of the embodiment 10 on the circuit 100. As illustrated by these FIGS., each wire segment 102–118, 124, and 130–138 is replaced with a representative wire resistor 202–218, 224, and 230–238, respectively, having a resistance that is substantially equal to that of the respective wire segment. Also, each transistor 120–122 and 126–128 is replaced with a representative switch resistor 220–222 and 226–228, respectively, having a resistance substantially equal to that of the respective transistor.

Figure 4:
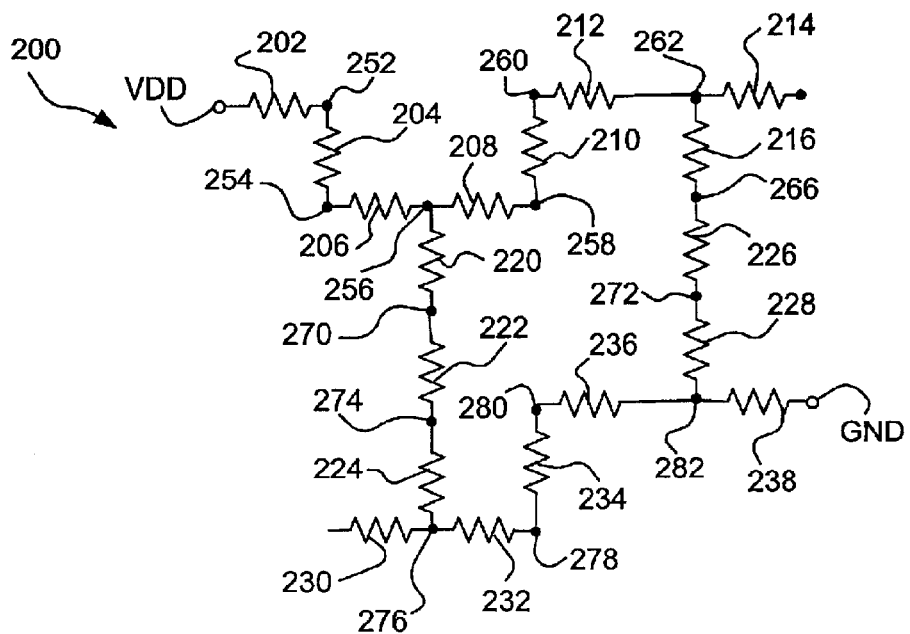
FIG. 4 is a schematic of a model that results from practice of an invention embodiment on the circuit portion of FIG. 3.

In the resistor model 200 of FIG. 4, a plurality of nodes is defined, with one node between connected resistors. The nodes 252–262 comprise power nodes in that they are "directly" connected to the power source VDD in an ideal case (e.g., ideal wire of zero resistance connects them to the power source VDD). That is, the power nodes 252–262 are separated from the power source VDD by wire resistors only. The nodes 270 and 277 are internal nodes in that they are separated from the power source VDD and the ground source GND by switch resistors 220–222 and 226–228, respectively. The nodes 274–282 are ground nodes because they are connected directly in an ideal case to the ground source GND, or in a non-ideal case are directly connected to the ground source GND by wire segments.

Referring once again to FIG. 1, the embodiment 10 further comprises a step of performing a DC circuit analysis of the thus created resistor model (block 22). The power analysis may generally be accomplished by simulating voltage from the power supplies at levels that correspond to the actual power supply levels of the circuit design. As the DC current propagates through the resistor model from the power sources, the wire resistors and switch resistors cause voltage drops to occur. The embodiment 10 advantageously allows for accurate modeling of the circuit architecture and logic as the power supplies are connected at model nodes that correspond to the actual connection point in the circuit design.

Also, in performing the DC circuit analysis, the embodiment 10 advantageously simulates a worst case switching scenario that assumes all switches are simultaneously in an "on" position. This eliminates the need for detailed knowledge of circuit logic and burdensome testing efforts that may otherwise be required for modeling multiplicities of different switch condition permutations. It will be appreciated that in modeling this worst-case "all-on" switching case, the embodiment 10 may provide a conservative circuit behavior model. It is also noted that although the method of the invention uses a DC circuit analysis, circuit nodes identified as having a large voltage drop under DC analysis are likely to also be sources of excessive impedance under AC switching conditions.

The embodiment 10 further comprises measuring the voltage drop at each power node, with drops preferably ranked by amount of voltage drop to identify a worst case node (block 24). A step of comparing the worst-case node voltage drop to a maximum voltage drop limit is also comprised (block 26). The maximum voltage drop limit may be set as desired to correspond to performance requirements for the IC such as a desired operating frequency or the like.

If the worst-case power node exceeds the maximum limit, the circuit design may be revised to improve the worst-case node performance (block 30). By way of example, such a design change may entail altering the geometry of a transistor or wire to lower the effective resistance, and may for example comprise enlarging the width or decreasing the length of the segment, or adding additional segments. The segment changed preferably comprises the segment that corresponds to the worst-case node. Other segments, which may number more than one, may also be changed upstream of the worst-case node.

When practicing a computer program product embodiment of the invention, the computer may be caused to query a user for a desired change to be made. For example, the program product may cause the computer to offer the user the choice of changing the length and/or width of the worst-case wire segment by a specified amount, or may offer the user the option of making a similar change to one or more other segments upstream of the worst-case node. In addition, the computer program product preferably generates a graphical image of the circuit being analyzed showing the physical location of high voltage drop power nodes.

The embodiment 10 additionally comprises a step of changing the resistor model to reflect the circuit design change made (block 32). A DC circuit analysis is subsequently performed on the changed resistor model (block 22), with the result that a "new" worst-case node is identified (block 24). If this node is outside the maximum limit, additional changes are made to the circuit design, and the model changing and DC analysis steps repeated (blocs 26–22). This iterative process of identifying a worst case node, making a design change, and re-testing the model may be continued until the circuit has been altered to an extent that no nodes have voltage drops larger than the maximum (block 28).

It is noted that other invention embodiments may comprise measuring the voltage drop at more or fewer of the nodes. For example, other embodiments may comprise measuring the voltage drop at the internal nodes and/or the ground nodes. Further, changes may be made to the circuit at locations other than the wire segments that correspond to the power nodes. For example, transistors or wire segments corresponding to ground nodes may be changed should they be identified as likely to pose an impedance problem.

In addition, it will be understood that other embodiments of the present invention may be practiced using circuit models other than a resistor model. Indeed, those skilled in the art will understand that the benefits of the present invention may be obtained by creating a circuit model that represents circuit elements with any idealized circuit element or a non-linear circuit element. Resistors are preferred in that use of idealized circuit elements will be limited in practice as idealized elements in series or parallel may not be practical. Likewise, use of non-linear elements may prove impractical in that resulting network equations describing the network model may be highly complex, and may require substantially more solution resources than a corresponding resistor model.

Other idealized circuit elements useful for practice with the present invention include, but are not limited to, idealized voltage sources, idealized current sources, and the like. Those knowledgeable in the art will appreciate that invention method steps and advantages as described herein with reference to practice with a resistor model will be generally consistent when using circuit models that comprise idealized circuit elements or non-linear circuit elements. By way of example, it will be understood that circuit switches will be modeled as idealized switch elements, or non-linear switch elements, and that circuit wires will be represented as idealized wire elements or non-linear wire elements. Accordingly, it will be appreciated that "wire elements," and "switch elements" used to create models in practice of invention embodiments may comprise idealized elements such as resistors, current sources, voltage sources, and the like, or non-linear elements such as non-linear current sources, non-linear voltage sources, and the like.

Methods and program products of the present invention thereby solve many otherwise unresolved problems in the art. For example, a method embodiment provides a relatively easily and quickly implemented method for gauging circuit impedance. The method utilizes a resistor model and thereby avoids much more detailed modeling methods requiring substantially greater computer resources. Additionally, by modeling all transistors as resistors, methods of the present invention model a conservative worst case switching scenario of all switches being simultaneously on. This allows invention embodiments to avoid modeling multiple switching permutations that can number into the millions or greater. Further, this allows for method embodiments to be utilized at relatively early stages of the design process so that identified "trouble spots" can be addressed with less effort than would be possible at later circuit design stages when switching logic came available.

The advantages of the disclosed invention are thus attained in an economical, practical, and facile manner. While preferred embodiments and example configurations have been shown and described, it is to be understood that various further modifications and additional configurations will be apparent to those skilled in the art. For example, it will be appreciated that although invention embodiments have been discussed and illustrated as occurring in a particular sequence, other embodiments may alter the sequence of steps. Indeed, it is intended that the specific embodiments and configurations herein disclosed are illustrative of the preferred and best modes for practicing the invention, and should not be interpreted as limitations on the scope of the invention as defined by the appended claims.

What is claimed is:

1. A method for evaluating a power distribution network for an integrated circuit, the circuit comprising at least a plurality of wires, a plurality of switches, and a plurality of power supplies, the method comprising the steps of:
    creating a circuit model of the circuit by representing each of the plurality of wires with at least a wire element, representing each of the plurality of switches with a switch element, said circuit model defining a plurality of nodes between connected elements; and
    performing a DC circuit analysis on said circuit model by simulating supply of DC power from the plurality of power supplies to said circuit model and simulating flow of DC current through each and every of said switch elements, and determining the voltage drop at at least a portion of said plurality of nodes of said circuit model.

2. A method as defined by claim 1 wherein the method comprises the step of simulating said DC power supply as originating at selected of said circuit model nodes that correspond to the location of the power supplies in the circuit.

3. A method as defined by claim 1 wherein the circuit design further comprises a plurality of capacitors, and wherein the step of creating a circuit model further comprises removing the plurality of capacitors from the design.

4. A method as defined by claim 1 wherein said plurality of nodes comprise power nodes and internal nodes, and wherein the step of determining the voltage drop at at least a portion of said nodes comprises determining the voltage drop at said power nodes.

5. A method as defined by claim 4 wherein said circuit model further comprises a plurality of DC power supplies, and wherein said power nodes being defined as nodes having only idealized wire circuit elements separating them from said DC power source.

6. A method for identifying a worst case voltage drop node in an integrated circuit, the circuit comprising at least a plurality of wires, a plurality of transistors, and a plurality of power supplies, the method comprising the steps of:
    creating a resistor model of the design by dividing each of the wires into a plurality of wire segments, each wire segment being defined by a substantially straight run of a constant width, determining the resistance of each of said wire segments by multiplying its sheet resistivity by a ratio of its length to width, representing each of said wire segments in said resistor model with a wire resistor of a resistance substantially equal to said wire segment resistance, representing each of the plurality of transistors in said resistor model with a switch resistor having a resistance substantially equal to the resistance of the respective of the transistors, providing a plurality of simulated DC power supplies connected to said resistor model at locations that correspond to the location of DC power supplies in the circuit, said resistor model defining a plurality of nodes comprising at least power nodes and internal nodes, said power nodes being separated from one of said simulated DC power supplies by only one or more wire resistors; and
    performing a DC power analysis on said resistor model by simulating supply of DC power from said plurality of simulated DC power supplies to said resistor model, determining the voltage drop at each of said power nodes, and determining a worst-case node having the largest voltage drop.

7. A method as defined by claim 6 wherein the method further comprises the step of comparing said worst case power node voltage drop with a maximum limit, and if said maximum limit is exceeded performing the steps of making at least a change to the circuit to lessen said worst case voltage drop and repeating said DC power analysis to determine a new worst case power node.

8. A computer program product for evaluating the quality of a power distribution network of an integrated circuit design, the circuit comprising a plurality of wires, a plurality of transistors, and a pluralityof power supplies, the program product comprising computer executable instructions embedded in a computer readable medium that when executed by the computer cause the computer to:
    create a circuit model by representing the plurality of wires with wire elements and representing the plurality of transistors with switch elements, said circuit model comprising a plurality of nodes between said elements, said nodes comprising power nodes and internal nodes; and perform a DC circuit analysis on said circuit model to model a worst case scenario in which all of said switch elements are in an on position by simulating a plurality of DC power supplies connected to said circuit model at locations corresponding to power supply locations on the network design and supplying DC current that flows through all of said switch elements, and measure a voltage drop at each of said power nodes.

9. A computer program product as in claim 8 wherein said circuit model comprises a resistor network, wherein said wire elements comprise wire resistors, and wherein said switch elements comprise switch resistors.

10. A computer program product as in claim 9 wherein the program instructions when executed by the computer further cause the computer to:
represent said wires as a plurality of individual wire segments, each of said segments defined by a portion of said wire having a substantially constant width and a substantially straight run, and wherein the program instructions cause the computer to represent each of said wire segments as an individual wire resistor.

11. A computer program product as in claim 9 wherein the program instructions when executed further cause the computer to determine the resistance for each of said wires by examining the wire sheet resistivity, length, and width.

12. A computer program product as in claim 8 wherein the program instructions when executed further cause the computer to compare said voltage drops measured at said power nodes to determine a worst case voltage node having the largest voltage drop, to compare said largest voltage drop to a maximum voltage drop and if said voltage drop exceeds said maximum voltage drop to modify said wire segment corresponding to said worst case node to lower the resistance of said segment, to change said circuit model to correspond to said changed worst case node, and to repeat said DC circuit analysis using said changed circuit model to determine a new worst case node.

13. A computer program product for identifying a worst case impedance caused voltage drop node in an integrated circuit design, the circuit comprising a plurality of wires, a plurality of transistors, and a plurality of power supplies, the program product comprising computer executable instructions embedded in a computer readable medium that when executed by the computer cause the computer to:
create a resistor network model by extracting circuit topology data from a data repository, said topology data comprising at least wire geometry data, wire sheet resistivity data, transistor geometry data, using said topology data to sub-divide each of the plurality of wires into a plurality of wire segments, each of said segments comprising a substantially straight run of a substantially constant width, determine the resistance of each of said wire segments by considering the sheet resistivity, length, and width of said wire segment, represent each of said wire segments in said resistor model as a wire resistor, said wire resistor having a resistance substantially equal to said wire segment resistance, determine the resistance of each of the plurality of transistors by considering at least said transistor geometry data, represent each of the plurality of transistors with a switch resistor having a resistance substantially equal to respective of the transistors, said resistor network model comprising a plurality of nodes between said resistors, said nodes comprising power nodes and internal nodes;
perform a DC power analysis on said resistor network model by simulating a plurality of DC power supplies connected to said resistor network at power nodes corresponding to power supply locations on the network design; and measure a voltage drop at each of said power nodes, compare said voltage drops to determine a worst case node having the largest voltage drop.

14. A computer program product as defined by claim 13, wherein the program instructions when executed further cause the computer to change the circuit design by altering said wire segment geometry of said wire segment corresponding to said worst case node, to change said resistor network model to reflect said changed circuit design, to perform a DC power analysis on said changed resistor network model, and to compare voltage drops measured at each of said power nodes to determine a new worst case node.

15. A method for evaluating a power distribution network for an integrated circuit, the circuit comprising at least a plurality of wires, a plurality of switches, and a plurality of power supplies, the method comprising the steps of:
creating a circuit model of the circuit by representing each of the plurality of wires with at least a wire element, representing each of the plurality of switches with a switch element, said circuit model defining a plurality of nodes between connected elements, said wire elements and said switch elements comprising a member selected from the group consisting of idealized current sources, idealized voltage sources, non-linear voltage sources, and non-linear current sources; and,
performing a DC circuit analysis on said circuit model by simulating supply of DC power from the plurality of power supplies to said circuit model, and determining the voltage drop at at least a portion of said plurality of nodes of said circuit model.

16. A method for evaluating a power distribution network for an integrated circuit, the circuit comprising at least a plurality of wires, a plurality of switches, and a plurality of power supplies, the method comprising the steps of:
creating a resistor model of the circuit by representing each of the plurality of wires with at least a wire resistor, each of said wire resistors being sized proportionate to the resistance of corresponding of the plurality of wires by considering the length, width, and sheet resistivity of the respective wire, representing each of the plurality of switches with a switch resistor, said circuit model defining a plurality of nodes between connected resistors; and
performing a DC circuit analysis on said circuit model by simulating supply of DC power from the plurality of power supplies to said circuit model, and determining the voltage drop at at least a portion of said plurality of nodes of said circuit model.

17. A method as defined by claim 16 wherein the plurality of wires comprise a plurality of vias, and wherein the method comprises the step of representing each of the vias with a proportionately sized wire resistor.

18. A method as defined by claim 17 wherein the method further comprises the step of subdividing the plurality of wires into a plurality of wire segments of constant width, and wherein each of said wire segments is represented by a wire resistor.

19. A method as defined by claim 16 wherein the plurality of switches comprise a plurality of transistors, and wherein each of said switch resistors being sized proportionate to the resistance of corresponding of the plurality of transistors by considering the length, width, and resistivity of the respective transistor.

20. A method for evaluating a power distribution network for an integrated circuit, the circuit comprising at least a plurality of wires, a plurality of switches, and a plurality of power supplies, the method comprising the steps of:

creating a circuit model of the circuit by representing each of the plurality of wires with at least a wire element, representing each of the plurality of switches with a switch element, said circuit model defining a plurality of nodes between connected elements;

performing a DC circuit analysis on said circuit model by simulating supply of DC power from the plurality of power supplies to said circuit model, and determining the voltage drop at at least a portion of said plurality of nodes of said circuit model; and determining a worst-case node having a larger voltage drop than any others of said nodes.

21. A method as defined by claim 20 wherein the method further comprises the steps of:

performing a design change on the circuit to lessen said worst-case voltage drop;

changing said circuit model to reflect said design change; and performing a DC circuit analysis on said changed resistor model to determine voltage drops at each of said nodes.

22. A method as defined by claim 20 wherein the method further comprises the steps of:

(a) determining whether said largest voltage drop exceeds a voltage drop limit;

(b) performing a design change on the design at a location corresponding to said worst case node to lessen said largest voltage drop when said largest voltage drop exceeds said voltage drop limit, changing said circuit model to reflect said design change; and (c) performing a DC circuit analysis on said changed resistor model to determine voltage drops at each of said power nodes, categorizing a node with the largest voltage drop as the new worst case node, and repeating steps (a)–(c) if said new worst case node voltage drop exceeds said voltage drop limit.

23. A computer program product for evaluating the quality of a power distribution network of an integrated circuit design, the circuit comprising a plurality of wires, a plurality of transistors, and a plurality of power supplies, the program product comprising computer executable instructions embedded in a computer readable medium that when executed by the computer cause the computer to:

create a circuit model by representing the plurality of wires with wire elements and representing the plurality of transistors with switch elements, said circuit model comprising a plurality of nodes between said elements, said nodes comprising power nodes and internal nodes;

perform a DC circuit analysis on said circuit model by simulating a plurality of DC power supplies connected to said circuit model at locations corresponding to power supply locations on the network design, and measure a voltage drop at each of said power nodes; and, comparing said voltage drops measured at said power nodes to determine a worst case voltage node having the largest voltage drop.

24. A computer program product as in claim 23 wherein the program instructions when executed cause the computer to obtain the wire sheet resistivity, length, and width through a query to a data repository.

* * * * *